US012559633B2

(12) United States Patent
Sato

(10) Patent No.: US 12,559,633 B2
(45) Date of Patent: Feb. 24, 2026

(54) AQUEOUS FLAME-RETARDANT COATING COMPOSITION AND FLAME-RETARDANT THERMOPLASTIC RESIN FILM

(71) Applicant: YUPO CORPORATION, Tokyo (JP)

(72) Inventor: Ryo Sato, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 659 days.

(21) Appl. No.: 17/914,077

(22) PCT Filed: Feb. 19, 2021

(86) PCT No.: PCT/JP2021/006487
§ 371 (c)(1),
(2) Date: Sep. 23, 2022

(87) PCT Pub. No.: WO2021/192767
PCT Pub. Date: Sep. 30, 2021

(65) Prior Publication Data
US 2023/0118686 A1 Apr. 20, 2023

(30) Foreign Application Priority Data
Mar. 27, 2020 (JP) ................................. 2020-058709

(51) Int. Cl.
*C09D 5/18* (2006.01)
*C09D 7/61* (2018.01)
*C09D 133/08* (2006.01)

(52) U.S. Cl.
CPC ................. *C09D 5/18* (2013.01); *C09D 7/61* (2018.01); *C09D 133/08* (2013.01)

(58) Field of Classification Search
CPC ........ C09D 133/08; C09D 5/024; C09D 5/18; C09D 7/61; C09D 133/00; C09D 133/12; C09D 161/28; C09D 167/08; C09D 175/04; C09D 201/00; C09D 133/06; C09D 163/10; C09D 7/62; C09D 133/10; C09D 143/04; C09D 163/00; C09D 167/00; C09D 171/02; C09D 201/10; C09D 5/008; C09D 5/1625; C09D 5/1668; C09D 7/48; C09D 7/65; C09D 7/70; C09D 143/02; C09D 5/02; C08K 2003/323; C08K 3/346; C08K 9/02; C08K 2003/2241; C08K 2201/014; C08K 13/06; C08K 2003/0806; C08K 2003/282;

C08K 3/016; C08K 3/04; C08K 3/32; C08K 5/12; C08K 5/31; C08K 5/34928; C08K 5/524; C08K 9/04; C08K 9/10
See application file for complete search history.

(56) References Cited

U.S. PATENT DOCUMENTS

| | | | |
|---|---|---|---|
| 2007/0135551 A1 | 6/2007 | Okuda et al. | |
| 2010/0272911 A1 | 10/2010 | Okuda et al. | |
| 2015/0267121 A1 | 9/2015 | Liu et al. | |
| 2019/0345346 A1 | 11/2019 | Peskens et al. | |

FOREIGN PATENT DOCUMENTS

| | | | | |
|---|---|---|---|---|
| CN | 101033359 | | 9/2007 | |
| CN | 105463853 A | | 4/2016 | |
| JP | 2003-171569 A | | 6/2003 | |
| JP | 2004210973 A | * | 7/2004 | |
| JP | 2006-176729 A | | 7/2006 | |
| JP | 2007186686 A | * | 7/2007 | ............. C08K 3/016 |
| JP | 2007-246697 A | | 9/2007 | |
| JP | 2015-535021 A | | 12/2015 | |
| WO | 2018/087315 A1 | | 5/2018 | |
| WO | WO-2020032210 A1 | * | 2/2020 | ............... C08K 5/13 |

OTHER PUBLICATIONS

Machine translation of JP-2007186686-A, including Table 2 (Year: 2007).*
Machine translation of JP 2004210973 A (Year: 2004).*
Machine translation of WO 2020032210 A1 (Year: 2020).*
Office Action that issued in corresponding Chinese Application No. 202180024004.1 on Feb. 1, 2023 along with translation thereof.
Office Action that issued in the corresponding Japanese Patent Application No. 2022-509420, dated Aug. 27, 2024, and its English translation.
ISR issued in International Patent Application No. PCT/JP2021/006487, Apr. 27, 2021, translation.
Written Opinion of the ISA issued in Int'l Patent Application No. PCT/JP2021/006487, Apr. 27, 2021, translation.
IPRP issued in International Patent Application No. PCT/JP2021/006487, Sep. 22, 2022, translation.

* cited by examiner

*Primary Examiner* — Amber R Orlando
*Assistant Examiner* — Ryan Patrick Loughran
(74) *Attorney, Agent, or Firm* — Greenblum & Bernstein, P.L.C.

(57) ABSTRACT
The present invention relates to an aqueous flame-retardant coating composition comprising an inorganic phosphate, inorganic particles, an aqueous binder resin soluble or dispersible in water, and water, wherein the content of the aqueous binder resin is from 3 to 60 parts by mass based on 100 parts by mass of the total of the inorganic phosphate and the inorganic particles.

10 Claims, No Drawings

AQUEOUS FLAME-RETARDANT COATING COMPOSITION AND FLAME-RETARDANT THERMOPLASTIC RESIN FILM

TECHNICAL FIELD

The present invention relates to an aqueous flame-retardant coating composition and a flame-retardant thermoplastic resin film.

BACKGROUND ART

Halogen flame retardants containing halogen have been conventionally used because of having relatively favorable moldability and mechanical strength in addition to a flame retardant effect. Halogen flame retardants, however, may generate halogen gas during processing or combustion, and there are concerns about impacts on human bodies and the environment, metal corrosion, and the like.

Then, examples of a non-halogen flame retardant containing no halogen include phosphorus flame retardants. Various flame-retardant resin compositions obtained by combining such a phosphorus flame retardant with a polyolefin-type resin, a nitrogen-containing resin, graphite, or the like have been contemplated.

Patent Literature 1 discloses a flame-retardant resin composition containing a thermoplastic resin, layered silicate, and a non-halogen flame retardant, mentioning a phosphorus compound as the non-halogen flame retardant.

However, in order for the flame-retardant resin composition disclosed in Patent Literature 1 to develop sufficient flame retardance, it is necessary to knead a large amount of a flame retardant into the substrate, and there is a concern over decrease in the moldability and mechanical strength of the flame-retardant resin composition.

Thus, Patent Literature 2 discloses a flame retarding composition comprising an organic resin component, an ammonium salt of inorganic phosphoric acid, and a layered inorganic material. An attempt to impart a flame retardance function has been made by coating the flame retarding composition onto a fiber sheet and drying the composition.

CITATION LIST

Patent Literature

Patent Literature 1 Japanese Patent Laid-Open No. 2003-171569

Patent Literature 2 Japanese Patent Laid-Open No. 2007-246697

SUMMARY OF INVENTION

Technical Problem

However, in order to achieve favorable flame retardance, it is necessary to thickly coat the flame retarding composition onto a surface of the fiber sheet. Thus, similarly as in kneading and impregnation, the properties inherent to the substrate such as the fiber sheet may be compromised, and there is also a concern on increase in the cost due to a large amount of its use.

It is thus an object of the present invention to provide a flame-retardant coating composition that contains no halogen, can be thinly coated onto a surface of a substrate, and can impart excellent flame retardance, and a flame-retardant thermoplastic resin film comprising a layer formed of the flame-retardant coating composition.

Solution to Problem

As a result of diligent studies, the present inventor has found that use of an aqueous flame-retardant coating composition containing an inorganic phosphate, inorganic particles, an aqueous binder resin, and water in a specific ratio can provide a sufficiently thin coating so as not to compromise the properties of the substrate and allows excellent flame retardance to be imparted, and has thus completed the present invention.

More specifically, the present invention relates to the following [1] to [12].

[1] An aqueous flame-retardant coating composition comprising an inorganic phosphate, inorganic particles, an aqueous binder resin soluble or dispersible in water, and water, wherein a content of the aqueous binder resin is from 3 to 60 parts by mass based on 100 parts by mass of the total of the inorganic phosphate and the inorganic particles.

[2] The aqueous flame-retardant coating composition according to the [1], wherein a mass ratio represented by the inorganic phosphate:the inorganic particles is from 95:5 to 50:50.

[3] The aqueous flame-retardant coating composition according to the [1] or [2], wherein the inorganic phosphate comprises ammonium polyphosphate.

[4] The aqueous flame-retardant coating composition according to any one of the [1] to [3], wherein the inorganic particles comprise layered silicate.

[5] The aqueous flame-retardant coating composition according to any one of the [1] to [4], wherein the aqueous binder resin is crosslinked with at least one crosslinking agent selected from the group consisting of a metal crosslinking agent, an epoxy crosslinking agent, an epichlorohydrin crosslinking agent, and an oxazoline crosslinking agent.

[6] The aqueous flame-retardant coating composition according to any one of the [1] to [5], wherein the aqueous binder resin comprises an acrylic resin, and the acrylic resin is dispersed in the aqueous flame-retardant coating composition.

[7] A flame-retardant thermoplastic resin film, comprising a layer formed of the aqueous flame-retardant coating composition according to any one of the [1] to [6] on at least one surface of a thermoplastic resin film.

[8] A flame-retardant thermoplastic resin film comprising a flame-retardant layer containing an inorganic phosphate, inorganic particles, and an aqueous binder resin soluble or dispersible in water on at least one surface of a thermoplastic resin film, wherein a content of the aqueous binder resin is from 3 to 60 parts by mass based on 100 parts by mass of the total of the inorganic phosphate and the inorganic particles.

[9] The flame-retardant thermoplastic resin film according to the [8], wherein a mass ratio represented by the inorganic phosphate:the inorganic particles is from 95:5 to 50:50.

[10] The flame-retardant thermoplastic resin film according to the [8] or [9], wherein with respect to 100 $g/m^2$ of the resin component of the thermoplastic resin film, the flame-retardant layer has 1 to 45 $g/m^2$ of the inorganic phosphate and 0.1 to 25 $g/m^2$ of the inorganic particles.

[11] The flame-retardant thermoplastic resin film according to any one of the [8] to [10], wherein with respect to 100 g/m² of the resin component of the thermoplastic resin film, the flame-retardant layer has less than 50 g/m² in total of the inorganic phosphate and the inorganic particles.

[12] The flame-retardant thermoplastic resin film according to any one of the [8] to [11], comprising at least one of a printed layer and a print receiving layer on the surface of the flame-retardant layer opposite to the side on which the thermoplastic resin film is located.

Advantageous Effect of Invention

The aqueous flame-retardant coating composition according to the present invention, which is excellent in coatability and flame retardance, develops excellent flame retardance even when thinly coated onto a substrate surface. Thus, the aqueous flame-retardant coating composition can impart favorable flame retardance at low cost without compromising the properties of the substrate.

A flame-retardant thermoplastic resin film comprising a layer formed of the aqueous flame-retardant coating composition exhibits excellent flame retardance and simultaneously develops properties intrinsic to the thermoplastic resin film without inhibition.

DESCRIPTION OF EMBODIMENT

The present invention will be explained in more detail below. However, the present invention is not limited to the embodiments described below, and the present invention can be optionally modified and carried out insofar as it does not depart from the scope of the invention.

\<Aqueous Flame-Retardant Coating Composition\>

The aqueous flame-retardant coating composition according to the present embodiment (hereinafter, may be simply referred to as the "coating composition") contains an inorganic phosphate, inorganic particles, an aqueous binder resin soluble or dispersible in water, and water. The content of the aqueous binder resin is from 3 to 60 parts by mass based on 100 parts by mass of the total of the inorganic phosphate and the inorganic particles.

\<Inorganic Phosphate\>

An inorganic phosphate is a component that primarily functions as a flame retardant in the coating composition. As the phosphoric acid of the "inorganic phosphate", orthophosphoric acid, phosphorous acid, hypophosphorous acid, polyphosphoric acid, or the like is incorporated, and orthophosphoric acid is preferable. The inorganic phosphate forms a noncombustible carbonized layer called char by a dehydration carbonization reaction caused by a strong acid generated upon combustion. Meanwhile, the inorganic phosphate also exerts a radical trapping effect in a gas phase. The inorganic phosphate serves a function as a flame retardant by insulating the substrate from heat and oxygen particularly by means of the carbonized layer described above.

The inorganic phosphate is not particularly limited as long as it is a salt that serves the function described above, and examples thereof include ammonium salts of inorganic phosphoric acid and metal salts of inorganic phosphoric acid. One of these inorganic phosphates may be used, or two or more of these may be used. From the viewpoint of the effects of the present invention, ammonium salts of inorganic phosphoric acid are more preferable as the inorganic phosphate.

In the case of an ammonium salt of inorganic phosphoric acid, when a decomposition temperature is reached due to heating associated with combustion, ammonia is desorbed, and then a condensed phosphoric acid is formed. This condensed phosphoric acid serves as a dehydration solvent to form the carbonized layer described above. Ammonia gas simultaneously generated serves as a foaming agent, acting to expand the coating composition.

Examples of ammonium salts of inorganic phosphoric acid include ammonium monophosphate, ammonium diphosphate, ammonium triphosphate, ammonium phosphite, ammonium hypophosphite, and ammonium polyphosphate. Of these, from the viewpoint of water resistance of a coating film, ammonium polyphosphate is preferable.

In the case of a metal salt of inorganic phosphoric acid, the metal salt serves as a dehydration catalyst, and additionally acts itself to form a noncombustible inorganic phosphate film.

Examples of metal salts of inorganic phosphoric acid include sodium salts such as monosodium phosphate, disodium phosphate, trisodium phosphate, monosodium phosphite, disodium phosphite, and sodium hypophosphite; potassium salts such as monopotassium phosphate, dipotassium phosphate, tripotassium phosphate, monopotassium phosphite, dipotassium phosphite, and potassium hypophosphite; lithium salts such as monolithium phosphate, dilithium phosphate, trilithium phosphate, monolithium phosphite, dilithium phosphite, and lithium hypophosphite; barium salts such as barium dihydrogen phosphate, barium hydrogen phosphate, tribarium phosphate, and barium hypophosphite; magnesium salts such as magnesium monohydrogen phosphate, magnesium dihydrogen phosphate, trimagnesium phosphate, and magnesium hypophosphite; calcium salts such as calcium dihydrogen phosphate, calcium hydrogen phosphate, tricalcium phosphate, and calcium hypophosphite; zinc salts such as zinc phosphate, zinc phosphite, and zinc hypophosphite; and aluminum salts such as aluminum phosphate, aluminum phosphite, and aluminum hypophosphite. Of these, in view of exerting high flame retardance by forming an oxide film, aluminum phosphite is preferable.

When ammonium polyphosphate is used as the inorganic phosphate, the ammonium polyphosphate may be produced, or a commercially available product may be used. Examples of such commercially available products include EXOLIT AP 423 (trade name) and AP462 (trade name) manufactured by Clariant AG, Sumisafe P (trade name) manufactured by Sumitomo Chemical Company, Limited, and TERRAJU C60 (trade name) manufactured by CHISSO CORPORATION.

The average primary particle size of the inorganic phosphate is preferably 0.5 μm or more, more preferably 3.0 μm or more, even more preferably 5.0 μm or more, in view of inhibiting increase in the coating viscosity. Additionally, in view of dispersibility and flame retardance of particles, more specifically, in the view that a smaller particle size increases a specific surface area to thereby improve the flame retardance, the average primary particle size is preferably 35 μm or less, more preferably 25 μm or less, even more preferably 15 μm or less.

In the present description, the average primary particle size of the inorganic phosphate is a volume-average particle size to be measured with a laser scattering particle size distribution analyzer (SALD-2200 manufactured by Shimadzu Corporation), referring to a median diameter represented by D50.

The content of the inorganic phosphate in the coating composition is preferably 50 parts by mass or more, more preferably 55 parts by mass or more, even more preferably 70 parts by mass or more based on 100 parts by mass of the total of the inorganic phosphate and inorganic particles, in the view that a carbonization foam layer is sufficiently formed to thereby exert flame retardance. The content of the inorganic phosphate is preferably 95 parts by mass or less, more preferably 85 parts by mass or less, even more preferably 78 parts by mass or less because the inorganic phosphate is prevented from coming off from the flame-retardant layer and sufficient flame retardance can be exerted.

Inorganic Particles

The inorganic particles are not particularly limited as long as the particles form noncombustible gas or an inorganic layer as a result of heating from combustion.

Examples thereof include layered silicate, titanium oxide, silica, boric acid, zinc borate, lead borate, sodium borate (borax), expandable graphite, calcium carbonate, magnesium carbonate, glass (hollow glass beads), Silas (Silas balloons), zinc oxide, zirconium oxide, alumina, silica alumina, magnesia, zeolite, aluminum hydroxide, and magnesium hydroxide. One of these may be used, or two or more of these may be used.

Of inorganic particles, layered silicate is preferable in view of an effect of shutting off combustible gas generated on combustion. Examples of layered silicate include smectite clay minerals such as montmorillonite, saponite, hectorite, beidellite, stevensite, and nontronite, talc, kaolinite, pyrophyllite, vermiculite, halloysite, and swellable mica.

Of those described above, smectite clay minerals can incorporate much water between crystal layers. Thus, upon heating by combustion, water incorporated between the layers described above evaporates to cool the thermoplastic resin, and the evaporated water lowers the surrounding oxygen concentration. Smectite clay minerals are more preferable because of their higher effect of further improving flame retardance due to these. Of smectite clay minerals, montmorillonite and beidellite are even more preferable.

The average primary particle size of the inorganic particles is preferably 0.01 μm or more, more preferably 0.05 μm or more, even more preferably 0.1 μm or more, in view of inhibiting increase in the viscosity of the coating. When the average primary particle size of the inorganic particles is smaller than that of particles of the inorganic phosphoric acid, the inorganic particles penetrate into gaps between the particles of the inorganic phosphoric acid. This penetration is preferable because a denser layer is formed and thus a combustible gas flow is shut off to thereby further improve flame retardance. Specifically, the average primary particle size of the inorganic particles is preferably 10 μm or less, more preferably 8 μm or less, even more preferably 6 μm or less.

In the present description, the average primary particle size of the inorganic particles is a volume-average particle size to be measured with a laser scattering particle size distribution analyzer (SALD-2200 manufactured by Shimadzu Corporation), referring to a median diameter represented by D50.

The content of the inorganic particles in the coating composition is preferably 5 parts by mass or more, more preferably 15 parts by mass or more, even more preferably 22 parts by mass or more based on 100 parts by mass of the total of the inorganic phosphate and inorganic particles because a content falling below the lower limit value lowers the flame retardance, in other words, the water content may decrease and combustible gas may be insufficiently shut off. The content of the inorganic particles is preferably 50 parts by mass or less, more preferably 45 parts by mass or less, even more preferably 30 parts by mass or less, for the purpose of inhibiting increase in the viscosity of the coating.

In other words, the ratio of contents (mass ratio) represented by inorganic phosphate:inorganic particles is preferably from 95:5 to 50:50, more preferably from 85:15 to 55:45, even more preferably from 85:15 to 70:30 or from 78:22 to 55:45, still even more preferably from 78:22 to 70:30. A ratio of contents of from 95:5 to 50:50 means that the content ratio of the inorganic particles with respect to the total content of the inorganic phosphate and inorganic particles is from 0.05 to 0.5.

The content ratio of the inorganic particles is preferably 0.05 or more, for the purpose of certainly achieving a sufficient water content and obtaining favorable flame retardance by means of shut-off of combustible gas. The content ratio of the inorganic particles is preferably 0.5 or more, for the purpose of inhibiting increase in the viscosity of the coating.

(Aqueous Binder Resin)

An aqueous binder resin means a resin soluble or dispersible in water.

Water is also contained in the coating composition. Thus, when dissolving in water contained in the coating composition, the aqueous binder resin is contained as an aqueous solution. When the aqueous binder resin does not dissolve in water contained in the coating composition, the aqueous binder resin is contained in a dispersed state in water, that is, as an emulsion. From the viewpoint of water resistance, the aqueous binder resin is preferably contained as an emulsion. Dispersed in the present description means that the resin particles are present in a uniform and stable state in the solvent.

The content of the aqueous binder resin in the coating composition is 3 parts by mass or more, preferably 5 parts by mass or more, more preferably 10 parts by mass or more based on 100 parts by mass of the total of the inorganic phosphate and inorganic particles, from the viewpoint of obtaining favorable surface strength upon formation into a coating film. Also, the content of the aqueous binder resin is 60 parts by mass or less, preferably 45 parts by mass or less, more preferably 30 parts by mass or less, from the viewpoint of obtaining favorable flame retardance.

Examples of aqueous binder resins dispersible in water include acrylic resins, urethane resins, fluorine resins, polystyrene resins, and vinyl chloride resins. One of these resins may be used, or two or more of these resins may be used. These resins may be also used with an aqueous binder resin soluble in water.

These resins may be modified with another resin component or may be partially crosslinked with a crosslinking agent.

Of these, from the viewpoints of weatherability and handleability, an acrylic resin is preferable, and an acrylic resin is more preferably dispersed in the coating composition.

The acrylic resin in the present description means a polymer of at least one (meth)acrylic monomer selected from the group consisting of (meth)acrylic acid monomers and (meth)acrylic ester monomers, and may be a copolymer of a (meth)acrylic monomer and another monomer. (Meth)

7 acrylic acid herein refers to at least one of acrylic acid and methacrylic acid. Of acrylic resins, styrene acrylic resins are particularly preferable.

From the viewpoint of flexibility, the aqueous binder resin dispersible in water is preferably a thermoplastic resin.

Examples of aqueous binder resins soluble in water include acrylic resins, silicone resins, acrylic silicone resins, fluorine resins, epoxy resins, vinyl resins, phenol resins, urethane resins, melamine resins, and ketone resins. One of these resins may be used, or two or more of these resins may be used.

Of these, from the viewpoints of weatherability and handleability, acrylic resins are preferable. From the viewpoint of flexibility, thermoplastic resins are preferable.

These resins may be modified with another resin component or may be partially crosslinked with a crosslinking agent.

Types of crosslinking agent are not particularly limited, and the resin is preferably crosslinked by at least one crosslinking agent selected from the group consisting of metal crosslinking agents, epoxy crosslinking agents, epichlorohydrin crosslinking agents, and oxazoline crosslinking agents, in view of the water resistance of the coating film.

Examples of metal crosslinking agents include ammonium zirconium carbonate, sodium zirconium carbonate, and zinc sulfate, and ammonium zirconium carbonate is preferable because of an effect of developing water resistance.

The content of the crosslinking agent depends on the crosslinking agent to be used. For example, in the case where a metal crosslinking agent is used, the content of the metal crosslinking agent based on 100 parts by mass of the total content of the aqueous binder resin is preferably 0.04 parts by mass or more, more preferably 0.2 parts by mass or more, even more preferably 0.4 parts by mass or more in order to favorably exert the effect of crosslinking. In view of the viscosity of the coating and the flexibility of the coating film, the content is preferably 32 parts by mass or less, more preferably 16 parts by mass or less, even more preferably 8 parts by mass or less.

(Solvent or Dispersion Medium)

Water is contained as a solvent or dispersion medium in the coating composition, and a solvent or dispersion medium other than water may be further contained. Water is favorable from the viewpoints of impacts on the environment and human bodies and costs, and ion exchange water is more preferable.

Examples of solvents or dispersion media other than water include alcohols such as ethanol and 2-propanol.

The content of water based on the total amount of the solvent and dispersion medium of the coating composition is preferably 50% by mass or more, more preferably 90% by mass or more, even more preferably 100% by mass. Water is preferably ion exchange water.

The solid concentration of the coating composition is preferably 3% by mass or more, more preferably 5% by mass or more, even more preferably 8% by mass or more. Additionally, the solid concentration is preferably 30% by mass or less, more preferably 25% by mass or less, even more preferably 20% by mass or less.

The solid concentration of the coating composition is a value obtained by precisely weighing 1.0 g of the coating composition in an aluminum cup, drying it in an oven at 120° C. for 30 minutes, precisely weighing the mass of the residue, and determining a proportion of the residual mass to the original mass as the non-volatile content (% by mass).

The solid concentration of the coating composition can be adjusted by means of the total content of the solvent and dispersion medium.

(Optional Components)

The coating composition can contain other optional components in addition to the components described above as long as the effect of the present invention is not compromised.

Examples of other optional components include a silane coupling agent, a pigment, a humectant, a dispersant, an emulsifier, a thickener, an anti-settling agent, an anti-skinning agent, an anti-sagging agent, an antifoaming agent, a color separation inhibitor, a leveling agent, a desiccant, a plasticizer, an anti-corrosive agent, an antimicrobial agent, an insecticide, a preservative, a light stabilizer, an ultraviolet absorber, an antistatic agent, and an electric conductivity imparting agent. As these, known ones can be used in a known manner.

(Coating Method)

The coating composition can be prepared by mixing the above-described inorganic phosphate, inorganic particles, aqueous binder resin, water, and other optional components.

The resulting coating composition is coated onto at least one surface of a substrate, which is an object onto which the composition is coated, and the coated composition is dried to thereby obtain a coating film. The coating film of the coating composition may be formed on one surface of the substrate or may be formed on both the surfaces thereof. From the viewpoint of the flame retardance of the flame-retardant thermoplastic resin film, the coating film is preferably formed on both the surfaces of the substrate. When the coating film is formed on both the surfaces, the configurations of the coating films of both the surfaces may be the same or different, and the thicknesses thereof may be the same or different.

The coating film is a coating film formed by evaporation of the solvent such as water of the coating composition, and will be a flame-retardant layer containing an inorganic phosphate, inorganic particles, and an aqueous binder resin soluble or dispersible in water.

The substrate onto which the coating composition according to the present embodiment is coated is not particularly limited, and examples thereof include thermoplastic resin films, thermosetting resin films, non-woven fabric, paper, and glass. Of these, in view of more markedly exerting an advantage of the coating composition according to the present embodiment in that high flame retardance can be exerted with a thin film thickness, a thermoplastic resin film is preferable.

The thermoplastic resin constituting the thermoplastic resin film is not particularly limited, and examples thereof include polyethylene resins, polypropylene resins, polyester resins, polyamide resins, polystyrene resins, polyethylene terephthalate resins, polyvinyl chloride resins, and polycarbonate resins. One of these may be used, or two or more of these may be used.

The coating composition can be coated onto any of the substrates described above. For example, in the case where a thermoplastic resin film is used as the substrate, a suitable coating mass of the coating composition varies depending on the difference in the oxygen indexes of thermoplastic resins constituting the film.

An oxygen index is the minimum oxygen concentration in a gas mixture of oxygen and nitrogen that is necessary for a resin to maintain flaming combustion. It can be said that a resin having a smaller oxygen index is likely to burn and a resin having a larger oxygen index is unlikely to burn.

Of the above-exemplified thermoplastic resins constituting the thermoplastic resin film, examples of resins having an oxygen index of less than 20 include polyethylene resins, polypropylene resins, and polystyrene resins.

On the other hand, examples of resins having an oxygen index of 20 or more include polyethylene terephthalate resins, polyvinyl chloride resins, and polyamide resins. As the "oxygen indexes" in the present description, the values described in "Plastics, 44 (9), 18, 1993 (Polymer data book P. 91)" were employed.

Thermoplastic resins having an oxygen index of less than 20 are more likely to burn than thermoplastic resins having an oxygen index of 20 or more, and thus are more preferable in view of obtaining an effect of flame retardance caused by the coating composition according to the present embodiment. Of these, even more preferable are polyethylene resins and polypropylene resins, which have a low oxygen index and are said to be generally difficult to flame-retard.

On the other hand, when thermoplastic resins having an oxygen index of 20 or more are used, the resins are originally more unlikely to burn than thermoplastic resins having an oxygen index of less than 20. Accordingly, such resins are more preferable in view of becoming a flame-retardant thermoplastic resin film that is unlikely to burn, even with a smaller coating mass of the coating composition according to the present embodiment, and polyethylene terephthalate resins and polyamide resins are even more preferable.

A smaller amount of coating of the coating composition than that of a conventional coating composition enables high flame retardance to be imparted to the substrate, irrespective of the oxygen index of the thermoplastic resin film.

As for the coating mass upon formation of a coating film from the coating composition onto the thermoplastic resin film, even with a total coating mass of the inorganic phosphate and inorganic particles of less than 50 g/m$^2$ based on 100 g/m$^2$ of the resin component of the thermoplastic resin film, sufficient flame retardance can be imparted.

In the case of an oxygen index of the thermoplastic resin film of less than 20, the total coating mass of the inorganic phosphate and inorganic particles is more preferably less than 50 g/m$^2$, even more preferably less than 40 g/m$^2$ based on 100 g/m$^2$ of the resin component of the thermoplastic resin film. The total coating mass of the inorganic phosphate and inorganic particles is more preferably 15 g/m$^2$ or more, even more preferably 25 g/m$^2$ or more.

Meanwhile, in the case of an oxygen index of the thermoplastic resin film of 20 or more, the total coating mass of the inorganic phosphate and inorganic particles is more preferably 20 g/m$^2$ or less, even more preferably 10 g/m$^2$ or less based on 100 g/m$^2$ of the resin component of the thermoplastic resin film because high flame retardance can be achieved with a flame-retardant layer having a smaller film thickness. The total coating mass of the inorganic phosphate and inorganic particles is more preferably 0.5 g/m$^2$ or more, even more preferably 2 g/m$^2$ or more.

When the total coating mass of the inorganic phosphate and inorganic particles is set to the above-described upper limit or less, the productivity of a flame-retardant thermoplastic resin film to be obtained can be certainly achieved and increase in the cost can be inhibited. When the total coating mass thereof is set to the above-described lower limit or more, the flaming combustion time of a flame-retardant thermoplastic resin film to be obtained can be reduced.

There are as mentioned above the content ratio between the inorganic phosphate and inorganic particles contained in the flame-retardant layer (mass ratio) and the content of the aqueous binder resin based on 100 parts by mass of the total of the inorganic phosphate and inorganic particles.

In the case where the substrate is a thermoplastic resin film, the thickness thereof is preferably 50 μm or more, more preferably 60 μm or more, even more preferably 70 μm or more, from the viewpoint of obtaining a favorable film strength. From the viewpoint of obtaining favorable flexibility, the thickness of the substrate is preferably 300 μm or less, more preferably 200 μm or less, even more preferably 100 μm or less.

<Flame Retardant Thermoplastic Resin Film>

The flame-retardant thermoplastic resin film according to the present embodiment comprises a flame-retardant layer containing an inorganic phosphate, inorganic particles, and an aqueous binder resin soluble or dispersible in water on at least one surface of a thermoplastic resin film.

The content of the aqueous binder resin is from 3 to 60 parts by mass based on 100 parts by mass of the total of the inorganic phosphate and inorganic particles.

Preferred aspects of the inorganic phosphate, inorganic particles, and aqueous binder resin soluble or dispersible in water constituting the flame-retardant layer, and of the thermoplastic resin film each are the same as the preferred aspects described in the <Aqueous flame-retardant coating composition> described above.

In the case where a flame-retardant layer is formed on both the surfaces of the thermoplastic resin film, the flame-retardant layers of both the surfaces may have the same configuration or may have a different configuration, and the thicknesses thereof also may be the same or different.

In the case where a flame-retardant layer is formed on both the surfaces, as for the preferable contents and coating masses of the inorganic phosphate, inorganic particles, and aqueous binder resin constituting the flame-retardant layers, the total content and coating mass of the inorganic phosphate, inorganic particles, and aqueous binder resin constituting the flame-retardant layer on both the surfaces are allowed to correspond to the preferable content and coating mass described in the <Aqueous flame-retardant coating composition> described above.

The flame-retardant thermoplastic resin film also can comprise at least one of a printed layer and a print receiving layer on the surface of the flame-retardant layer opposite to the side on which the thermoplastic resin film is located.

The printed layer is a layer comprising characters and images formed of printing ink or toner, and examples of print methods that can be used include various printing methods such as offset printing, an inkjet printing method, an electrophotographic (laser) method, a heat-sensitive recording method, and a thermal transfer method. Accordingly, the printed layer is only required to be located at the outermost surface of the flame-retardant thermoplastic resin film to cover at least a partial region of the flame-retardant thermoplastic resin film surface, or the printed layer may cover the entire region.

As the printed layer, conventionally known ones can be used in a known manner.

The print receiving layer is a layer that functions as an ink or toner receiving layer when the printed layer is provided.

The properties of the printed layer, such as abrasion resistance, antistatic properties, printability, water resistance, and storage stability can be adjusted by means of the nature of the print receiving layer.

As the print receiving layer, conventionally known ones can be used in a known manner.

The flame-retardant thermoplastic resin film can be provided with any other layers in addition to the printed layer and print receiving layer as long as the effect of the present invention is not compromised. Examples of any other layers include a pressure-sensitive adhesive layer, a gloss layer, and a gas barrier layer.

<Physical Properties of Aqueous Flame-Retardant Coating Composition>

(Flame Retardance: UL94 VTM Test)

For evaluating the flame retardance of the aqueous flame-retardant coating composition, a thermoplastic resin film is used as a substrate, an aqueous flame-retardant coating composition is coated onto both the surfaces thereof, and the coated composition is dried to obtain a flame-retardant thermoplastic resin film including flame-retardant layers formed thereon. The resin film is used to conduct the following test.

The flame-retardant thermoplastic resin film is cut into a sheet form of 50 mm×200 mm, and a reference line is marked at a position of 125 mm from the lower end of the long side of the sheet. Then, the sheet is left to stand under conditions of 23° C. and a relative humidity of 50% for 48 hours or more for conditioning.

Cellophane tape® is attached to the range of 125 to 200 mm from the lower end of the long side of the sheet, and the short side is rounded and bonded such that the diameter is 13 mm to thereby make the sheet into a cylinder.

The upper end of the cylindrical sheet is clamped and hung, and 0.05 g or less of cotton (100%) is placed 300 mm below the lower end.

A burner having a diameter of 10 mm is provided and adjusted such that the gas flow rate is 105 mL/minute and a blue flame has a height of 20 mm. Flame application for 3 seconds is conducted twice such that the burner is located between the cylindrical sheet and the cotton and that the lower end of the cylindrical sheet is brought to the 10-mm height position of the blue flame. It is checked whether or not melting of the cylindrical sheet reaches the reference line due to the operation and whether or not the cotton (100%) has burned due to ignition caused by dropping of the sheet melt. No melting of the cylindrical sheet preferably reaches the reference line, and no cotton more preferably burns.

(Flame Retardance: Flaming Combustion Time)

In the same manner as in the UL94 VTM test described above, a cylindrical sheet of the flame-retardant thermoplastic resin film is subjected to flame application for 3 seconds, and the time required for the flame ignited on the cylindrical sheet to be extinguished is measured. The time required for the extinguishment is preferably less than 20 seconds, more preferably less than 15 seconds.

(Coatability)

An aqueous dispersion is obtained in which the amount of water has been adjusted so as to allow the solid concentration of the aqueous flame-retardant coating composition to be 10% by weight, which dispersion is subjected to evaluation of coatability of the aqueous flame-retardant coating composition. The viscosity of the aqueous dispersion is measured using a B-type viscometer at a rotor rotational speed of 60 rpm and 20° C. From the viewpoint of suitably coating with a small coating mass to thereby obtain a favorable coating film, the viscosity is preferably 8000 mPa·s or less, more preferably 1500 mPa·s or less, even more preferably 500 mPa·s or less. From the viewpoint of inhibiting occurrence of aggregations due to precipitation of inorganic phosphate and the like, the viscosity is preferably 5 mPa·s or more, more preferably 50 mPa·s or more, even more preferably 100 mPa·s or more.

(Surface Strength)

For evaluation of the surface strength of a flame-retardant layer formed by using the aqueous flame-retardant coating composition, the following test will be conducted.

Cellophane tape® manufactured by Nichiban Co., Ltd. cut off to a length of 5 cm is attached to the surface of the flame-retardant layer, and the 2.5-cm portion of the tape is peeled off at a low speed (2.5 cm/s) and the residual 2.5-cm portion at a high speed (25 cm/s) by hand. The surface strength is evaluated based on the degree of the peeling of the flame-retardant layer after the peeling. The areas subjected to peeling by peeling at a high speed and a low speed each are preferably smaller.

EXAMPLES

Examples, Comparative Examples, and Test Examples will described below, and the present invention will be explained more concretely. The materials, amounts used, ratios, operations, and the like shown in the following examples can be appropriately changed without departing from the spirits of the present invention. The scope of the present invention is therefore not limited to the specific examples shown below. % described below means % by mass unless otherwise specified.

Example 1

75 parts by mass of an inorganic phosphate (ammonium polyphosphate, EXOLIT AP 423 manufactured by Clariant Chemicals Ltd., average primary particle size D50=10 μm), 25 parts by mass of inorganic particles (purified bentonite, Kunipia-F manufactured by Kunimine Industries Co. Ltd., average primary particle size D50=2 μm), 25 parts by mass (in terms of solid content) of an aqueous binder resin (styrene acrylic resin, Hiros X·ZE-1425 manufactured by Seiko PMC Corporation, solid concentration: 48% by mass), and 1 part by mass of a crosslinking agent (ammonium zirconium carbonate, 5800MT manufactured by San Nopco Ltd.) were mixed, and ion exchange water was blended thereto so as to achieve a solid concentration of 10% by mass, and thus an aqueous flame-retardant coating composition was obtained. Bentonite is inorganic particles mainly based on montmorillonite.

The obtained aqueous flame-retardant coating composition was coated onto both the surface of a thermoplastic resin film (polypropylene synthetic paper, porous biaxially-stretched film, FPG80 manufactured by Yupo Corporation, thickness: 80 μm) with a bar coater such that each coating mass in terms of solid content was 5 g/m². Thereafter, the composition was dried at 80° C. for 10 minutes to form flame-retardant layers, and thus a flame-retardant thermoplastic resin film was obtained.

The contents of the inorganic phosphate and inorganic particles based on 100 g/m² of the resin component of the flame-retardant thermoplastic resin film each are as described in Table 1.

The solid concentration of the coating composition is a value determined by precisely weighing 1.0 g of the coating composition in an aluminum cup, drying this in an oven at 120° C. for 30 minutes, precisely weighing the mass of the residue, and calculating the mass ratio of the residue with respect to the original mass as the non-volatile content (% by mass).

Examples 2 to 6 and Comparative Examples 1 to 3

Flame retardant thermoplastic resin films of each of Examples 2 to 6 and Comparative Examples 1 to 3 were obtained in the same manner as in Example 1 except that the blend ratio of the inorganic phosphate, inorganic particles, and aqueous binder resin and the coating mass of the aqueous flame-retardant coating composition were changed to the values described in Table 1. Each "-" in the entries of the aqueous flame-retardant coating composition in Table 1 means not containing.

Examples 7 and 8

Flame retardant thermoplastic resin films of each of Examples 7 and 8 were obtained in the same manner as in Example 1 except that a thermoplastic resin film (polypropylene synthetic paper, porous biaxially-stretched film, FPG130 manufactured by Yupo Corporation, thickness: 130 μm) was used and the coating mass of the aqueous flame-retardant coating composition was changed to the value shown in Table 1.

Example 9

A flame-retardant thermoplastic resin film was obtained in the same manner as in Example 1 except that a thermoplastic resin film (polypropylene synthetic paper, porous biaxially-stretched film, FPG200 manufactured by Yupo Corporation, thickness: 200 μm) was used and the coating mass of the aqueous flame-retardant coating composition was changed to the value shown in Table 1.

Example 10

A flame-retardant thermoplastic resin film was obtained in the same manner as in Example 1 except that a thermoplastic resin film (polypropylene synthetic paper, porous biaxially-stretched film, FPG250 manufactured by Yupo Corporation, thickness: 250 μm) was used and the coating mass of the aqueous flame-retardant coating composition was changed to the value shown in Table 1.

Example 11

A flame-retardant thermoplastic resin film was obtained in the same manner as in Example 1 except that a thermoplastic resin film (polyethylene terephthalate, biaxially-stretched film, DIAFOIL O-100E manufactured by Mitsubishi Gas Chemical Company, Inc., thickness: 100 μm) was used and the coating mass of the aqueous flame-retardant coating composition was changed to the value shown in Table 1.

Examples 12 to 15 and Comparative Examples 4 to 5

Flame retardant thermoplastic resin films were obtained in the same manner as in Example 1 except that the blend ratio of the aqueous binder resin and the coating mass of the aqueous flame-retardant coating composition were changed to the values described in Table 1.

Comparative Example 6

A flame-retardant thermoplastic resin film was obtained in the same manner as in Example 11 except that the blend ratio of the inorganic phosphate, inorganic particles, and aqueous binder resin and the coating mass were changed to the values described in Table 1.

Comparative Example 7

A flame-retardant thermoplastic resin film was obtained in the same manner as in Example 1 except that an organic phosphate (a compound containing a diester structure of pentaerythritol and phosphoric acid in the main skeleton, Fire Guard FCX210 manufactured by TEIJIN LIMITED, average primary particle size D50=20 μm), colloidal silica as the inorganic particles, and a mixed emulsion of a styrene-acrylic ester copolymer and a polyester resin as the aqueous binder resin were used instead of the flame-retardant coating composition of Example 1 and the coating mass was set to the coating mass in terms of solid content described in Table 1. "*" in the blend ratio of the inorganic phosphate in Table 1 means that the blend ratio was described in the entry for convenience, although an organic phosphoric acid was used.

The obtained flame-retardant thermoplastic resin films were subjected to the following evaluations. The results are shown in Table 1. In the coatability evaluation, a numerical value means a viscosity, a parenthesized letter means evaluation of A to D, and "-" means that no evaluation was conducted.

(Flame Retardance: UL94 VTM Test)

The flame-retardant thermoplastic resin film was cut into a sheet form of 50 mm×200 mm, and a reference line was marked at a position of 125 mm from the lower end of the long side of the sheet. Then, the sheet was left to stand under conditions of 23° C. and a relative humidity of 50% for 48 hours or more for conditioning.

Cellophane tape® was attached to the range of 125 to 200 mm from the lower end of the long side of the sheet, and the short side was rounded and bonded such that the diameter was 13 mm to thereby make the sheet into a cylinder.

The upper end of the cylindrical sheet was clamped and hung, and 0.05 g or less of cotton (100%) was placed 300 mm below the lower end.

A burner having a diameter of 10 mm was provided and adjusted such that the gas flow rate was 105 mL/minute and a blue flame had a height of 20 mm. Flame application for 3 seconds was conducted twice such that the burner was located between the cylindrical sheet and the cotton and that the lower end of the cylindrical sheet was brought to the 10-mm height position of the blue flame. It was checked whether or not melting of the cylindrical sheet reached the reference line due to the operation and whether or not the cotton (100%) had burned due to ignition caused by dropping of the sheet melt, and the flame retardance was evaluated based on the following criteria. A represents pass, and B and C represent failure.

A (favorable): No melting of the cylindrical sheet reached the reference line, and no cotton burned.

B (poor): Melting of the cylindrical sheet reached the reference line, but no cotton burned.

C (very poor): Melting of the cylindrical sheet reached the reference line, and also the cotton burned.

(Flame Retardance: Flaming Combustion Time)

In the same manner as in the UL94 VTM test described above, a cylindrical sheet of the flame-retardant thermoplastic resin film was subjected to flame application for 3 seconds, the time required for the flame ignited on the cylindrical sheet to be extinguished was measured, and the flame retardance was evaluated based on the following criteria. A and B represent pass, and C represents failure.

A (very favorable): Extinguished in less than 15 seconds.

B (favorable): Extinguished in 15 seconds or more and less than 20 seconds.

C (poor): Extinguished in 20 seconds or more, or not extinguished.

(Coatability)

The viscosity of an aqueous flame-retardant coating composition having a solid concentration of 10% by weight was measured using a B-type viscometer at a rotor rotational speed of 60 rpm and 20° C. and evaluated based on the following criteria. A to C represent pass, and D represents failure.

A (very favorable): The viscosity is from 100 to 500 mPa·s.

B (favorable): The viscosity is 50 mPa·s or more and less than 100 mPa·s, or more than 500 mPa·s and 1500 mPa·s or less.

C (normal): The viscosity is 5 mPa·s or more and less than 50 mPa·s, or more than 1500 mPa·s and 8000 mPa·s or less.

D (poor): The viscosity is less than 5 mPa·s or more than 8000 mPa·s.

(Surface Strength)

Cellophane tape manufactured by Nichiban Co., Ltd. cut off to a length of 5 cm was attached to the surface of the flame-retardant layer, and the 2.5-cm portion of the tape was peeled off at a low speed (2.5 cm/s) and the residual 2.5-cm portion at a high speed (25 cm/s) by hand. The surface strength was evaluated based on the degree of the peeling of the flame-retardant layer after the peeling and evaluated based on the following criteria. 2 or more represent pass, and 1 represents failure.

5: No peeling was observed both at the low and high speeds.

4: No peeling was observed at the low speed, and peeling was partially observed (less than 50% of the entire surface subjected to the high-speed peeling) at the high speed.

3: No peeling was observed at the low speed, and peeling was entirely observed (50% or more of the entire surface subjected to the high-speed peeling) at the high speed.

2: Peeling was partially observed (less than 50% of the entire surface subjected to the low-speed peeling) at the low speed and entirely observed (50% or more of the entire surface subjected to the high-speed peeling) at the high speed.

1: Peeling was entirely observed both at the low and high speeds.

TABLE 1

| | Thermoplastic resin film | | | Aqueous flame-retardant coating composition | | | |
| | | | | | | Aqueous binder resin | Coating mass (in terms of solid content) |
| | Oxygen index | Thickness (μm) | Resin component (g/m²) | Inorganic phosphate (parts by mass) | Inorganic particles (parts by mass) | (in terms of solid content) (parts by mass) | front surface/back surface (g/m²) |
|---|---|---|---|---|---|---|---|
| Example 1 | 18 | 80 | 42.7 | 75 | 25 | 25 | 5/5 |
| Example 2 | 18 | 80 | 42.7 | 75 | 25 | 25 | 10/10 |
| Example 3 | 18 | 80 | 42.7 | 90 | 10 | 25 | 10/10 |
| Example 4 | 18 | 80 | 42.7 | 80 | 20 | 25 | 10/10 |
| Example 5 | 18 | 80 | 42.7 | 60 | 40 | 25 | 10/10 |
| Example 6 | 18 | 80 | 42.7 | 50 | 50 | 25 | 10/10 |
| Example 7 | 18 | 130 | 70.8 | 75 | 25 | 25 | 10/10 |
| Example 8 | 18 | 130 | 70.8 | 75 | 25 | 25 | 15/15 |
| Example 9 | 18 | 200 | 109.7 | 75 | 25 | 25 | 20/20 |
| Example 10 | 18 | 250 | 131.3 | 75 | 25 | 25 | 30/30 |
| Example 11 | 21 | 100 | 139.3 | 75 | 25 | 25 | 2/2 |
| Example 12 | 18 | 80 | 42.7 | 75 | 25 | 3 | 10/10 |
| Example 13 | 18 | 80 | 42.7 | 75 | 25 | 7 | 10/10 |
| Example 14 | 18 | 80 | 42.7 | 75 | 25 | 40 | 10/10 |
| Example 15 | 18 | 80 | 42.7 | 75 | 25 | 60 | 10/10 |
| Comparative Example 1 | 18 | 80 | 42.7 | — | — | — | — |
| Comparative Example 2 | 18 | 80 | 42.7 | 100 | — | 25 | 10/10 |
| Comparative Example 3 | 18 | 80 | 42.7 | — | 100 | 25 | 10/10 |
| Comparative Example 4 | 18 | 80 | 42.7 | 75 | 25 | — | 10/10 |
| Comparative Example 5 | 18 | 80 | 42.7 | 75 | 25 | 100 | 10/10 |
| Comparative Example 6 | 21 | 100 | 139.3 | — | — | — | — |
| Comparative Example 7 | 18 | 80 | 42.7 | 97* | 3 | 143 | 10/10 |

TABLE 1-continued

| | Aqueous flame-retardant coating composition | | | | | | |
| | Content based on 100 g/m² | | | | Evaluation results | | |
| | of Resin component of thermoplastic resin film | | | | Flame retardance evaluation | | Coatability |
| | Inorganic phosphate (g/m²) | Inorganic particles (g/m²) | Total (g/m²) | Inorganic phosphate:inorganic particles (mass ratio) | UL94 VTM test | Flaming combustion time | evaluation Viscosity (mPa · S) | Surface strength |
|---|---|---|---|---|---|---|---|---|
| Example 1 | 14.1 | 4.7 | 18.8 | 75:25 | A | B | 320 (A) | 4 |
| Example 2 | 28.1 | 9.4 | 37.5 | 75:25 | A | A | 320 (A) | 4 |
| Example 3 | 33.3 | 3.7 | 37.0 | 90:10 | A | A | 8 (C) | 4 |
| Example 4 | 29.7 | 7.5 | 37.2 | 80:20 | A | A | 60 (B) | 4 |
| Example 5 | 22.2 | 14.8 | 37.0 | 60:40 | A | A | 1400 (B) | 4 |
| Example 6 | 18.5 | 18.5 | 37.0 | 50:50 | A | A | 7000 (C) | 4 |
| Example 7 | 16.9 | 5.6 | 22.5 | 75:25 | A | B | 320 (A) | 4 |
| Example 8 | 25.4 | 8.5 | 33.9 | 75:25 | A | A | 320 (A) | 4 |
| Example 9 | 21.9 | 7.3 | 29.2 | 75:25 | A | A | 320 (A) | 4 |
| Example 10 | 27.4 | 9.1 | 36.5 | 75:25 | A | A | 320 (A) | 4 |
| Example 11 | 1.7 | 0.6 | 2.3 | 75:25 | A | A | 320 (A) | 4 |
| Example 12 | 33.8 | 11.2 | 45.0 | 75:25 | A | A | 80 (B) | 2 |
| Example 13 | 31.7 | 10.5 | 42.2 | 75:25 | A | A | 200 (A) | 3 |
| Example 14 | 24.1 | 8.0 | 32.1 | 75:25 | A | B | 800 (B) | 5 |
| Example 15 | 21.8 | 7.3 | 29.1 | 75:25 | A | B | 1000 (B) | 5 |
| Comparative Example 1 | — | — | — | — | C | C | — | — |
| Comparative Example 2 | 37.2 | — | 37.2 | 100:0 | B | C | 3 (D) | 4 |
| Comparative Example 3 | — | 37.2 | 37.2 | 0:100 | B | C | 10000 or more (D) | 4 |
| Comparative Example 4 | 34.8 | 11.6 | 46.4 | 75:25 | C | C | 40 (C) | 1 |
| Comparative Example 5 | 17.5 | 5.8 | 23.3 | 75:25 | C | C | 2000 (C) | 5 |
| Comparative Example 6 | — | — | — | — | C | C | — | — |
| Comparative Example 7 | 22.2 | 0.6 | 22.8 | 97:3 | B | C | 10 (C) | 4 |

The above results have confirmed that the flame-retardant layer formed of the aqueous coating composition according to the present embodiment is excellent in coatability and enables a thin coating film to be formed. The flame-retardant layer also shows excellent flame retardance, and thus it has been found that even a thin coating film can impart sufficient flame retardance to the substrate.

Although the invention has been explained in detail with reference to specific embodiments, it is apparent to those skilled in the art that various changes and modifications can be made without departing from the spirit and scope of the invention. The present application is based on Japanese Patent Application filed on Mar. 23, 2020 (Japanese Patent Application No. 2020-058709), the contents of which are hereby incorporated by reference.

INDUSTRIAL APPLICABILITY

The aqueous coating composition according to the present invention can be thinly coated and shows excellent flame retardance even in a small amount. Accordingly, the composition is markedly useful when the composition imparts high flame retardance to the substrate while formed into a flame-retardant layer with a thin film so as not to compromise the properties of the substrate.

The invention claimed is:

1. An aqueous flame-retardant coating composition comprising an inorganic phosphate, inorganic particles, an aqueous binder resin soluble or dispersible in water, and water, wherein a content of the aqueous binder resin is from 3 to 60 parts by mass based on 100 parts by mass of the total of the inorganic phosphate and the inorganic particles, and the mass ratio represented by the inorganic phosphate:the inorganic particles is from 85:15 to 50:50.

2. The aqueous flame-retardant coating composition according to claim 1, wherein the inorganic phosphate comprises ammonium polyphosphate.

3. The aqueous flame-retardant coating composition according to claim 1, wherein the inorganic particles comprise layered silicate.

4. The aqueous flame-retardant coating composition according to claim 1, wherein the aqueous binder resin is crosslinked with at least one crosslinking agent selected from the group consisting of a metal crosslinking agent, an epoxy crosslinking agent, an epichlorohydrin crosslinking agent, and an oxazoline crosslinking agent.

5. The aqueous flame-retardant coating composition according to claim 1, wherein
the aqueous binder resin comprises an acrylic resin, and the acrylic resin is dispersed in the aqueous flame-retardant coating composition.

6. The aqueous flame-retardant coating composition according to claim 1, wherein the content of the aqueous binder resin is 3 parts by mass or more and 30 parts by mass or less based on 100 parts by mass of the total of the inorganic phosphate and the inorganic particles.

7. An aqueous flame-retardant coating composition comprising an inorganic phosphate, inorganic particles, an aqueous binder resin soluble or dispersible in water, and water, wherein a content of the aqueous binder resin is from 3 to 60 parts by mass based on 100 parts by mass of the total of the inorganic phosphate and the inorganic particles, and a content of water based on the total amount of the solvent and dispersion medium of the coating composition is 50% by mass or more.

8. The aqueous flame-retardant coating composition according to claim 7, wherein a mass ratio represented by the inorganic phosphate:the inorganic particles is from 95:5 to 50:50.

9. An aqueous flame-retardant coating composition comprising an inorganic phosphate, inorganic particles, an aqueous binder resin soluble or dispersible in water, and water, wherein a content of the aqueous binder resin is from 3 to 60 parts by mass based on 100 parts by mass of the total of the inorganic phosphate and the inorganic particles, and a solid concentration of the coating composition is 3 to 30% by mass.

10. A flame-retardant thermoplastic resin film, comprising a layer formed of the aqueous flame-retardant coating composition according to claim 1 on at least one surface of a thermoplastic resin film.

\* \* \* \* \*